United States Patent [19]

Gagliardi et al.

[11] Patent Number: 5,314,280
[45] Date of Patent: May 24, 1994

[54] SETTABLE HEIGHT ADJUSTING FASTENER

[75] Inventors: Matthew Gagliardi, Oswego, Ill.; Noah B. Mass, Ann Arbor, Mich.

[73] Assignee: Ford Motor Company, Dearborn, Mich.

[21] Appl. No.: 85,801

[22] Filed: Jul. 6, 1993

[51] Int. Cl.[5] .................. F16B 37/04; F16B 43/00; B23P 11/02
[52] U.S. Cl. .................. 411/182; 411/258; 411/508; 411/535; 403/28; 403/270; 403/406.1; 29/525.1
[58] Field of Search .................. 411/82, 258, 182, 15, 411/508-510, 535; 403/28, 265, 270, 405.1, 406.1, 407.1; 29/445, 525.1

[56] References Cited

U.S. PATENT DOCUMENTS

| | | | |
|---|---|---|---|
| 3,110,337 | 11/1963 | Biesecker | 411/15 |
| 3,604,306 | 9/1971 | Denholm | |
| 3,682,508 | 8/1972 | Briles | 287/189.36 F |
| 4,352,589 | 10/1982 | Allison et al. | 403/408 |
| 4,425,065 | 1/1984 | Sweeney | 411/23 |
| 4,433,930 | 2/1984 | Cosenza | 403/12 |
| 4,448,565 | 5/1984 | Peterson | 403/408 |
| 4,493,577 | 1/1985 | Cosenza | 403/41 |
| 4,690,365 | 9/1987 | Miller et al. | 248/650 |
| 4,818,164 | 4/1989 | Kazyak | 411/913 X |
| 4,826,380 | 5/1989 | Henry | 411/377 |
| 4,867,599 | 9/1989 | Sasajima | 403/405.1 |
| 4,868,968 | 9/1989 | Dixon et al. | 29/460 |
| 4,883,382 | 11/1989 | Mushya | 411/535 X |
| 4,912,826 | 4/1990 | Dixon et al. | 411/182 |
| 5,106,225 | 4/1992 | Andre et al. | 411/182 |

FOREIGN PATENT DOCUMENTS 701599  1/1965  Canada .......................... 411/258

*Primary Examiner*—Neill R. Wilson
*Attorney, Agent, or Firm*—Roger L. May; Daniel M. Stock

[57] ABSTRACT

A fastener for securing two workpieces together in a desired spatial relation, at an axial distance within a predetermined spacing range comprising a screw, an insert, and a heat curable member. The heat curable member has a predetermined thickness establishing a maximum spacing within the predetermined range. The screw is drawn down toward the insert and the heat curable member is reduced in thickness until the desired spacial relation is attained. The heat curable member is subsequently cured setting the fastener and the first and second workpieces in the desired special relation.

15 Claims, 2 Drawing Sheets

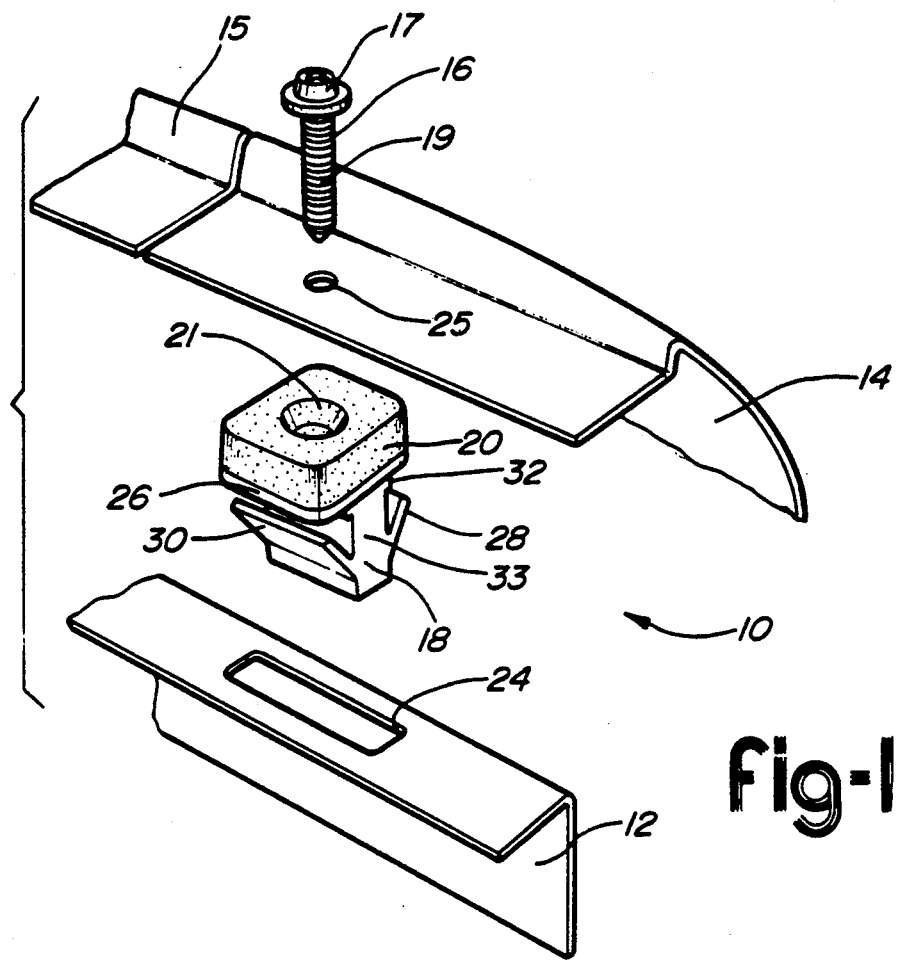
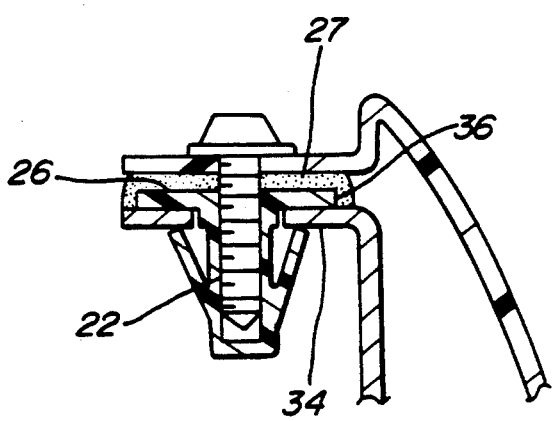
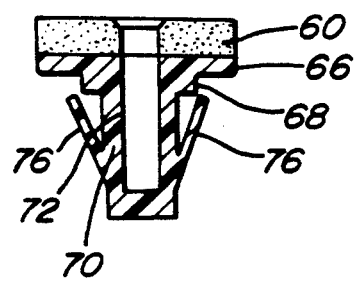

SETTABLE HEIGHT ADJUSTING FASTENER

TECHNICAL FIELD

This invention relates to a method and apparatus for securing two workpieces together in a desired spatial relation at an axial distance. More specifically, this invention relates to attaching outer body panels to automotive vehicle structures while assuring proper height adjustment and fit of adjacent panels with respect to each other during the assembly process.

BACKGROUND ART

It is common in the automotive industry to fabricate automotive vehicle bodies through the attachment of a plurality of metal or plastic body panels to a metallic sub-frame. The sub-frame cooperates with the outwardly facing body panels, to support and reinforce the body panels and carry the loads required in normal vehicle applications.

Recent practice in the automotive industry is utilization of plastic fabricated parts for some or all of the external body panels. The fastening of plastic outer body panels to a metallic inner structural sub-frame presents certain unique problems not previously dealt with in the automotive industry.

For example, conventional fastening techniques often distort the body panel near the point of attachment. In addition, common fastening techniques often include time consuming and sometimes difficult spatial adjustment of body panels in relation to each other. Specifically, the spatial relationship between adjacent body panels must be adjusted until the respective edges of the adjacent body panels are even or flush with each other. This affords aerodynamic advantages which are directly related to energy consumption of the vehicle and also adds particular aesthetic value to the overall appearance of the vehicle.

In addition to the assembly process, the spatial relationship of adjacent body panels is important when a vehicle body panel is damaged and must be repaired. Often these damaged body panels are removed and repaired or replaced with a new body panel. At this point, it is again necessary to spatially relate adjacent body panels to achieve maximum flushness between the outer respective edges of the adjacent panels.

One solution employed to overcome the above problems is disclosed in U.S. Pat. No. 4,868,968 to Dixon et al., also assigned to the assignee of the present invention. Dixon et al. discloses an assembly system in which a flanged cup is inserted into a hole in a metal sub-frame and a heat curing thixotropic plastic/adhesive is applied into the recess of the cup.

A heated fixture is next brought into contact with the plastic/adhesive to mold the adhesive to a predetermined height above the metallic sub-frame. The heated fixture simultaneously cures the plastic/adhesive and forms a fastener receiving aperture extending from its outer face into the cup area. Thus, in this system an intermediate plastic structure for positioning the plastic outer body panel with respect to the metal sub-frame is manufactured on the panel assembly line with the spatial relationship, i.e. the height of the intermediate plastic structure being set by the fixture, and not by a prepositioning of the actual body panel itself.

DISCLOSURE OF THE INVENTION

The present invention provides a settable height adjusting fastener for securing two workpieces together in a desired spatial relation in situ, i.e. as the workpieces are assembled and finally secured together. The present invention is particularly suited for assembling body panels to a sub-frame of an automotive vehicle. First and second members are provided with a means for adjusting the distance between the first and second members where one of the members is received within the other. A heat curable member is positioned adjacent the first and second members having a predetermined thickness establishing a maximum spacing between the two workpieces to be secured. The first member is then drawn down upon the second member and the heat curable member is thus reduced in thickness until the desired spatial relation is obtained. The heat curable member is then cured, thereby setting the workpieces in the desired spatial relation.

The present invention further includes a method of assembling body panels to a sub-frame of an automotive vehicle comprising the steps of forming an aperture in a first workpiece, forming an aperture in a second workpiece, introducing a first member into the first workpiece aperture, providing a heat curable member between said first workpiece and second workpiece, positioning a body panel onto the second workpiece in an abutting relationship, securing the first workpiece to the second workpiece at a desired spatial relation by engaging a second member with the first member and simultaneously deforming the heat curable member between the first workpiece and the second workpiece and curing the heat curable member to permanently maintain the desired spatial relation.

It is thus an object of the present invention to provide a height adjusting fastener which utilizes a heat curable member disposed between two workpieces, e.g. a body panel and the sub-frame of an automotive vehicle, and is deformable in the pre-curing state as the workpieces are being initially secured, and upon curing permanently maintains the desired pre-cured spatial elation.

It is yet another object of the present invention to provide a height adjusting fastener which allows a service person to remove the body panel from the sub-frame after assembly of the vehicle and reattachment of the same or new body panel without the need to readjust the body panel for spatial relation with respect to adjacent body panels.

These and other features and additional objects of the invention will occur to those skilled in the art on reading the following description with reference to the accompanying drawings.

BRIEF DESCRIPTION OF THE DRAWINGS

FIG. 1 is a perspective exploded view of an automobile body panel, a vehicle sub-frame and a fastener of the present invention;

FIG. 2 is a cross-sectional view of the present invention illustrating the body panel, fastener and sub-frame after securement;

FIG. 5 is a cross-sectional view of the fastener of the present invention as shown in FIG. 4 taken along line 5—5.

BEST MODE FOR CARRYING OUT THE INVENTION

Figure 3:
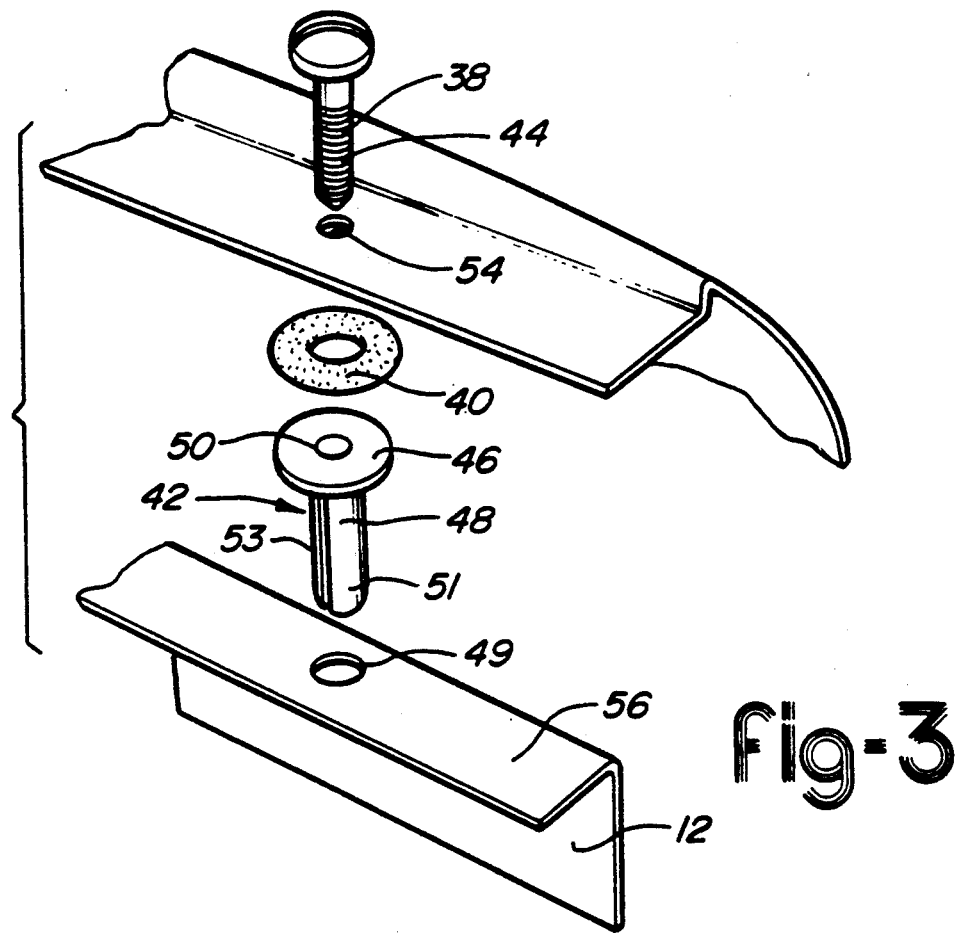
FIG. 3 is a perspective exploded view of an alternative embodiment of the present invention.

Referring now to the drawings, and in particular to FIG. 1, the preferred fastener 10 of the present invention is illustrated between a metallic subframe 12 and an automotive body panel 14. Fastener 10 generally includes a screw 16, an insert 18 and a deformable heat curable member 20 having a centered countersunk bore 22 disposed between screw 16 and insert 18.

Screw 16 as shown in FIG. 1 is a common self threading screw having a truncated Phillips driver head 17, and an elongate threaded portion 19. As can be seen from FIGS. 1 and 2, insert 18 is designed for placement into elongate slot 24 of metallic subframe 12. Insert 18 includes a head portion 26, a neck 32 and an elongated body portion 33 extending along the vertical axis of the insert on the side of the head portion opposite the heat curable member 20. A fastening bore 22 concentric with the insert vertical axis is formed so as to pass through the insert 20, head portion 26, neck portion 32 and body portion 33 to nearly its full depth. Looking at a cross-section of the insert taken in a plane perpendicular to the vertical axis, the bore 22 is centered relative to the length and width of the insert. Body portion 33 includes a pair of resilient retaining leg members 28 and 30 integrally molded as part of the body portion and each diverging from a respective side of the body portion at an acute angle and in the direction of the head portion and to a distance and length just short of the neck portion 32. Also, the neck portion 32 transverse width is slightly less than the width of elongate slot 24 as seen in FIG. 2. The major diameter of the countersink 21 of heat curable member 20 is sized to accommodate a certain axial misalignment of the screw 16 and bore 22.

Heat curable member 20 is disposed on head portion 26 which has a substantially planar surface between body panel 14 and the insert. It may be adhered to the insert by its own adhesive properties, or by a separate adhesive, thereby forming a separate subcomponent, or it may simply be interposed between panel 14 and the insert as a separate component as shown in FIG. 3. Heat curable member 20 has a maximum desired predetermined thickness such as 5 mm. In a preferred embodiment of the present invention it will be of a type manufactured by Dow Corning Inc. from Silastic ® HGS-70 silicone rubber Silastic ® HGS-70 is a general purpose, 70 durometer material that features high green strength. Silastic ® HGS-70 has a specific gravity of 1.20 at 77° F. and a tensile strength of 1200 psi after curing at 350° F. for 10 minutes.

This particular material will cure to a hardness sufficient to maintain the desired spatial relationship between subframe 12 and body panel 14 when subjected to temperatures ranging from 300° F. to 380° F. for short periods of time, e.g. one half hour or less. Thus, it is contemplated that a heat curable member manufactured from any material which cures at temperatures within a range of 300° F. to 380° F. for short periods of time but is substantially deformable in the green state can be utilized in the present invention. In addition, various materials could be utilized in manufacturing the heat curable member that cure at relatively lower temperatures (200° F.-300° F.) for longer periods of time, for instance, more than one half hour. The heat curable member of the present invention, in addition to being deformable in the green state, may also have particular adhesive qualities. These adhesive qualities may, as earlier referenced, be utilized to temporarily fasten the heat curable member either to head portion 26 or the inner surface 27 of body panel 14 prior to securing the body panel 14 to subframe 12. A heat curable member with relatively strong adhesive qualities, could also be utilized to fasten body panel 14 to subframe 12 without the use of a fastening member.

Installation of the insert on subframe 12 and subsequent assembly of the fastener and body parts is also illustrated in FIGS. 1 and 2. Insert 18 is positioned above slot 24 of metallic subframe 12 prior to assembly. Upon insertion, retaining members 28 and 30 are initially compressed and upon full insertion, extend out below the lower surface 34 of metallic subframe 12. As shown in FIG. 2, retaining members 28 and 30 securely position insert 18 within the slot 24 metallic subframe 12. Neck portion 32 is positioned within elongate slot 24 forming a near contact fit securing insert 18 from lateral movement within the metallic subframe 12.

As described previously, body panel 14 must be secured to metallic subframe 12 in a desired spatial relation at an axial distance within a predetermined spacing range. The desired spatial relation is preferably within a predetermined spacing range of 0 to 5 mm and is arrived at by adjusting the distance between the respective clamping surfaces of screw 16 and insert 18 to accomplish a flushness between adjacent body panels 15 and 16 as shown in FIG. 1. To achieve the desired spatial relation, screw 16 is drawn down on insert 18 thereby deforming heat curable member 20 from a maximum height in the uncured state to a desired height as shown in FIG. 2. Heat curable member 20 deforms between the head portion 26 and inner surface 27 of body panel 14. Thus, the flushness of body panel 14 with adjacent body panel 15 is acquired in situ as the panel 14 is initially secured in place. Distortion of body panel 14 is eliminated since heat curable member 18 is readily deformed in its uncured state but yet has sufficient resiliency and durability to hold the desired spatial relation between the workpiece prior to and during curing.

Heat curable member 20, when deformed, extends over outer portions 36 of substantially planar surface 26 while maintaining the desired spatial relation between body panel 14 and metallic subframe 12. At this point, the body panel subframe assembly, including fastener 10, is subjected to an overall curing process or spot curing process to set heat curable member 20 in its particular shape.

In automotive manufacturing processes it is common to subject metallic body parts to a rust inhibiting process such as electrocoating. Combined metallic and plastic assemblies are, in electrocoating processes, submerged in tanks of rust inhibiting electrocoat material and electrified to bond the electrocoat rust inhibitor only to the metallic parts.

These metallic and plastic assemblies are then removed and dried or cured in a baking process to remove all remaining electrocoat liquid material before moving on to a painting or priming process. These baking or curing processes maintain temperatures in a range of 300° F.-380° F. for short periods of time e.g. one half hour or less. Thus, as contemplated, use of the fastener of the present invention requires no additional curing step or process if utilized with current rust inhibiting manufacturing processes of the type described above.

After assembly, if it becomes necessary to repair or replace any particular body panel, each body panel may be now removed and repaired and/or replaced with a new body panel without needless adjustment of the spatial relation between the respective body panels. Specifically, upon securement of the repaired or new body panel, it is not necessary to adjust each individual body panel by the use of a fastener. To attain the desired spatial relation affording a flushness of adjacent body panels, fastening screw 16 is simply run down until secure abutment is made with body panel 14 and heat curable member 20. As the desired spatial relation has been maintained by the set heat curable member 20, no adjustment is necessary. The desired spatial relation is permanently maintained by the heat curable member.

FIG. 3 illustrates an alternative embodiment of the present invention utilizing a screw 38, a heat curable member 40 and a scrivet 42. Screw 38 includes self-tapping threaded portion 44. Scrivet 42 includes a head portion 46, an extending body portion 48 and a fastening bore 50. Heat curable member 40 is manufactured from the same heat curable material as discussed previously, a thermosetting silicon rubber.

To install, scrivet 42 is inserted into aperture 49 of surface 12. Aperture 49 is sized slightly larger than the diameter of extending body portion 48 to provide for alignment of the body parts. Screw 38 is sized relative to aperture 49 of panel 14 to permit play as with the embodiment of FIG. 1. Screw 38 is rotated and thus drawn toward substantially planar surface 46. The thread diameter of screw 38 is slightly larger than the diameter of fastening bore 50. Drawing screw 38 down within fastening bore 38 splits scrivet 42 into two retaining portions 51 and 53. Retaining portions 51 and 53 diverge apart in a direction away from head portion 46 and are pressed against aperture 49 retaining insert 42 within metallic subframe 12. As screw 38 is drawn down toward the substantially planar surface 46, body panel 14 is also drawn down towards subframe 12 and simultaneously, heat curable member 40 is deformed between inner surface 52 of the body panel 14 and surface 56 of metallic subframe 12. A desired spatial relation is achieved by adjusting screw 38 until respective adjacent body panels are flush. Again, heat curable member 40 is subjected to a curing process or spot curing process to set the heat curable member.

Figure 4:
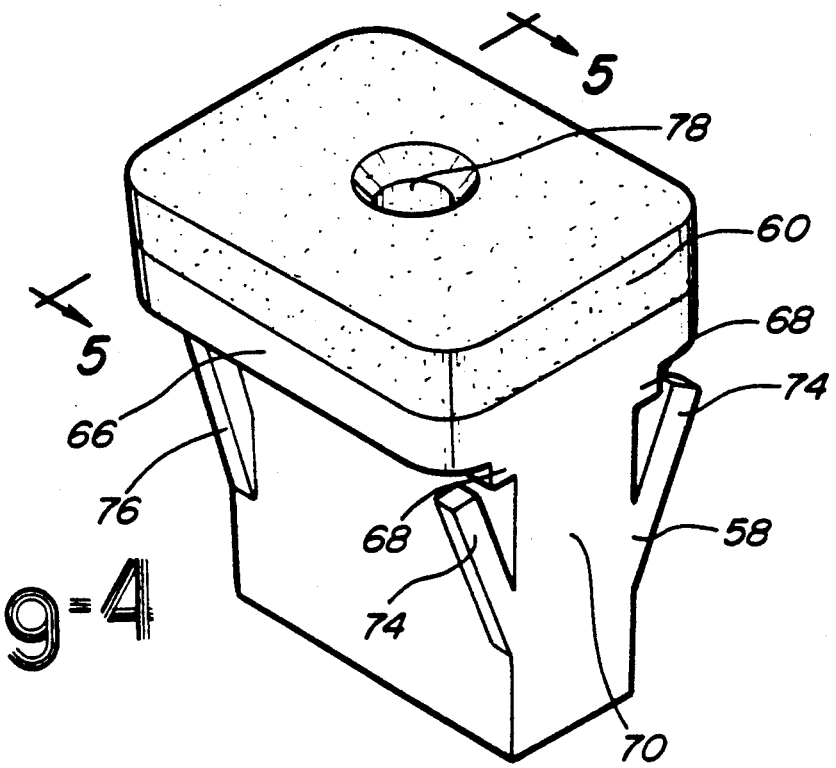
FIG. 4 is a perspective view of yet another alternative embodiment of the present invention.

A further alternative embodiment of the present invention is shown in FIGS. 4 and 5. The alternative embodiment includes an insert 58, a heat curable member 60, and a common self threading screw (not shown).

Insert 58 includes a head portion 66, a neck portion 68, and an elongate body portion 70, extending substantially along the vertical axis of the insert on the side of the head portion opposite the heat curable member 60. Body portion 70 includes a fastening bore 72 concentric with the insert vertical axis and is formed so as to pass through the insert 58, head portion 66, neck portion 68, and body portion 70 to nearly its full depth. Fastening bore 72 is centered relative to the length and width of the insert.

Body portion 70 further includes two pair of resilient retaining leg members 74 and 76 integrally molded as part of the body portion. As shown in FIG. 4, each pair of leg members is disposed on opposite ends of body portion 70 and each individual leg member diverges from a respective side of the body portion, at an acute angle and in the direction of the head portion and to a distance or length just short of the neck portion 68.

Heat curable member 60, as illustrated in FIG. 4, is substantially identical to heat curable member 20 as described previously and shown in FIG. 1. Heat curable member 60 includes a centered countersunk bore 78.

The alternative embodiment shown in FIGS. 4 and 5 operates in substantially the same manner as the preferred embodiment illustrated in FIG. 1. Insert 58 is positioned above an elongate slot within a metallic subframe prior to assembly. Upon insertion, pairs of retaining members 74 and 76 are initially compressed and upon full insertion, extend out below the lower surface of the metallic subframe. The retaining members 74 and 76 thus securely position insert 58 within the metallic subframe. Neck portion 68 is positioned within the elongate slot 24, again forming a near-contact fit securing insert 58 from fore and aft movement within the subframe 12. Body panel 14 is next secured to the subframe 12, deforming heat curable member 60 in substantially the same manner as that described previously with respect to the embodiment shown in FIGS. 1 and 2.

In addition to the height adjusting fastener disclosed above, the present invention includes a method of securing together body panel 14 to the subframe 12 in a spatial relation at an axial distance within a predetermined spacing range. The preferred method includes the step of forming an elongate slot 24 in subframe 12 and forming an additional aperture 25 in body panel 14 as illustrated in FIG. 1. Next, an insert 18 is introduced into elongate slot 24. Insert 18 is provided with a head portion 26. Heat curable member 20 is located on head portion 26 between metallic surface 12 and plastic body panel 14.

Body panel 14 s next positioned over subframe 12 in an abutting relationship to register aperture 22 over elongate slot 24. Upon positioning of body panel 14 over metal subframe 12, a screw 18 is threadably engaged within first member 16, thereby securing body panel 14 to subframe 12 and simultaneously deforming heat curable member 20. Second member 18 is threadably engaged within first member 16 until the desired spatial relation between the body panel and respective metallic subframe is achieved. Heat curable member 20 is thus deformed to a new shape and height and the desired spatial relationship is attained between body panel 14 and subframe 12 corresponding to the desired spatial relation of the adjacent body panel 15 and metallic subframe 12.

Lastly, heat curable member 20 is cured as previously described to permit or maintain the desired spatial relation. After curing the heat curable member of the present invention, the desired spatial relationship is permanently maintained by the setting of the heat curable member 20.

While only certain embodiments of the method and apparatus of the present invention have been shown and described, others may be possible without departing from the scope of the following claims.

We claim:

1. A fastener for securing two workpieces together in a desired spatial relation, at an axial distance, within a predetermined spacing range comprising:
   a first member;
   a second member;
   one said member being received within the other;
   said first and second members including respective clamping surfaces and
   means for positioning one member within the other member to establish the distance between the respective clamping surfaces of said first and second members within a predetermined distance range; and a heat curable member positioned adjacent said first and second members having a predetermined thickness establishing a maximum spacing within said predetermined range, whereby the first member is drawn toward the second member and the curable member is reduced in thickness until the desired spatial relation is obtained, said curable member thereafter being susceptible of being cured to thereby set the established distance between the respective clamping surfaces of said first and second members and thereby set the workpieces in the desired spatial relation.

2. A fastener as in claim 1 wherein said first member is threadedly received within said second member to thereby assist in drawing said one member within the other member to establish the distance between said respective clamping surfaces.

3. A fastener as in claim 1 wherein said second member includes a substantially planar head portion for receiving said heat curable member and a neck portion.

4. A fastener as in claim 3 wherein said second member includes an aperture extending through said substantially planar head portion and into said neck portion.

5. A fastener as in claim 3 further including a body portion extending from said neck portion and including a pair of retaining flanges diverging from said body portion at an acute angle toward said head portion.

6. A fastener as in claim 3 further including a body portion extending from said neck portion and including a pair of retaining flanges diverging from said body portion at an acute angle away from said head portion.

7. A fastener as in claim 3 further including a body portion extending from said neck portion, said body portion having a first and second pair of retaining members diverging from said body portion toward said head portion wherein said first and second pairs of retaining members are disposed on opposite ends of the body portion.

8. A fastener as in claim 1 wherein said heat curable member is a thermosetting silicone rubber.

9. A fastener as in claim 1 wherein said heat curable member cures at a temperature in a range of 300° to 380° F.

10. A fastener as in claim 1 wherein said heat curable member cures at a temperature in a range of 340° to 360° F.

11. A fastener as in claim 1 wherein said predetermined spacing range is 0 to 5 mm.

12. A fastener as in claim 1 wherein the predetermined thickness of said heat curable fastener is 5 mm.

13. A fastener in combination with a first workpiece and a second workpiece, wherein the first workpiece and second workpiece are to be secured together in a desired spatial relation, at an axial distance, within a predetermined spacing range, the fastener comprising:
a first member;
a second member;
one said member being received within the other;
means for infinitely adjusting the distance between said first and second workpieces within a predetermined distance range; and
a heat curable member positioned between said first and second workpieces having a predetermined thickness establishing a maximum spacing within said predetermined range, whereby the first member is drawn toward the second member thereby adjusting the distance between the first and second workpieces and the curable member is reduced in thickness until the desired spacial relation is obtained, said curable member thereafter being susceptible of being cured to thereby set the fastener and first and second workpieces in the desired spacial relation.

14. A method as defined in claim 13, and further comprising the steps of:
providing a heat curable member having an adhesive surface;
providing said first member with a substantially planar surface; and
joining said heat curable member to said first member by engagement of said adhesive surface to said first member on said substantially planar surface.

15. A method of securing a first workpiece having a first aperture disposed therein and a second workpiece having a second aperture disposed therein together in a spatial relation at an axial distance within a predetermined spacing range, the method comprising:
introducing a first member into said first workpiece aperture;
providing a deformable heat curable member between said first workpiece and second workpiece;
positioning the second workpiece over the first workpiece in an abutting relationship to register the second workpiece aperture over the first workpiece aperture;
securing said first workpiece to said second workpiece at the desired spatial relation by threadably engaging a second member within said first member through said first workpiece aperture and simultaneously deforming said deformable heat curable member between said first workpiece and said first member; and
curing the heat curable member to permanently maintain the desired spatial relation.

* * * * *